July 21, 1959 C. D. McCLURG 2,895,727
COMBINED SPRING GROUP AND FRICTION DAMPER
Filed May 17, 1954 3 Sheets-Sheet 1
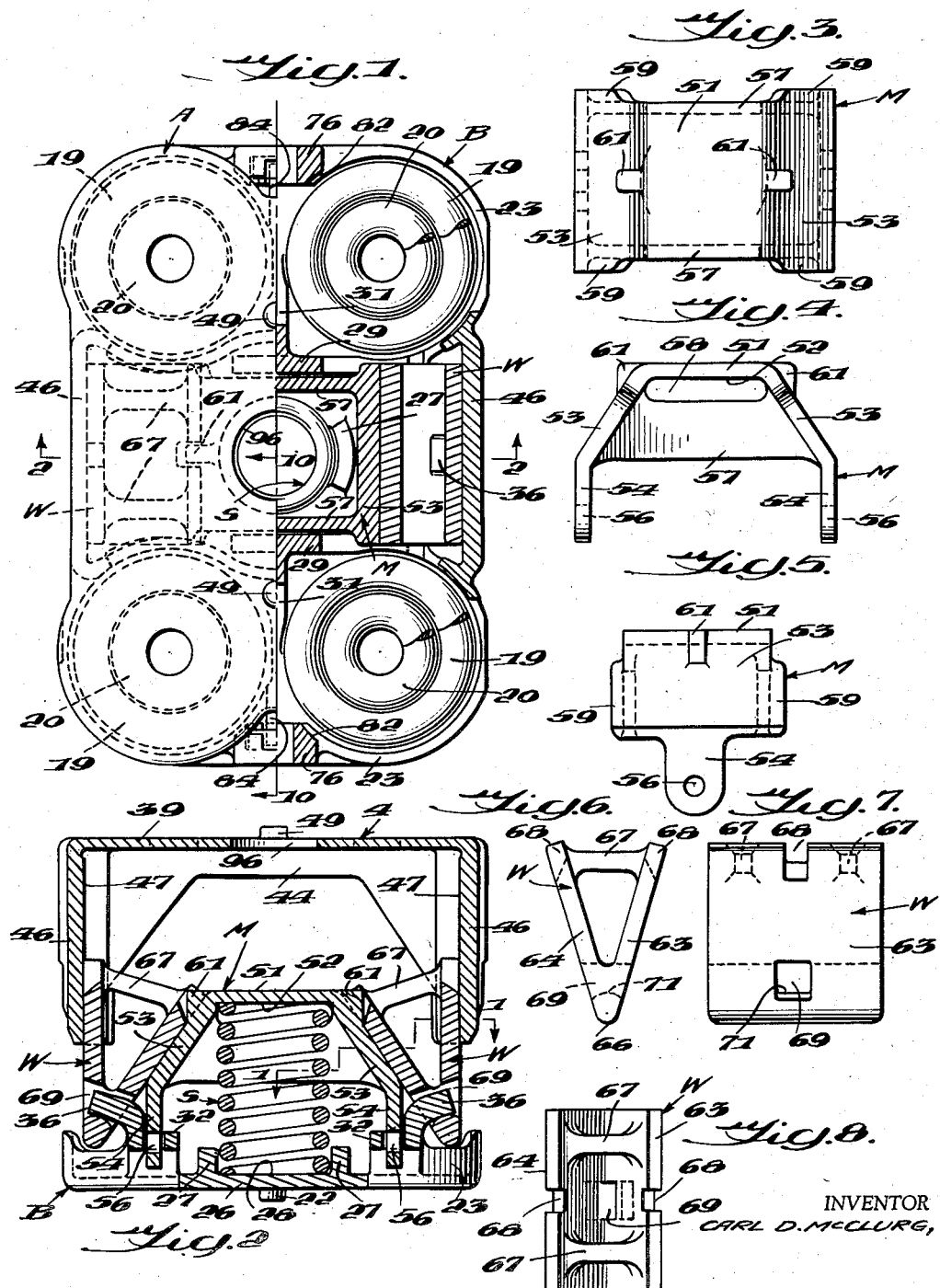
INVENTOR
CARL D. McCLURG,
BY
ATTORNEY July 21, 1959 C. D. McCLURG 2,895,727
COMBINED SPRING GROUP AND FRICTION DAMPER
Filed May 17, 1954 3 Sheets-Sheet 2
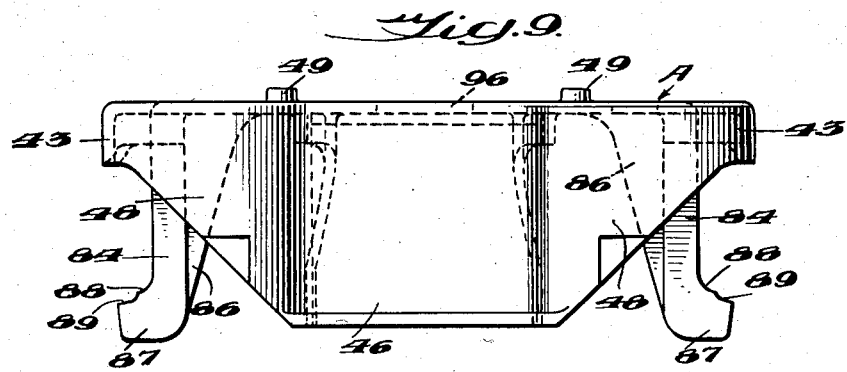
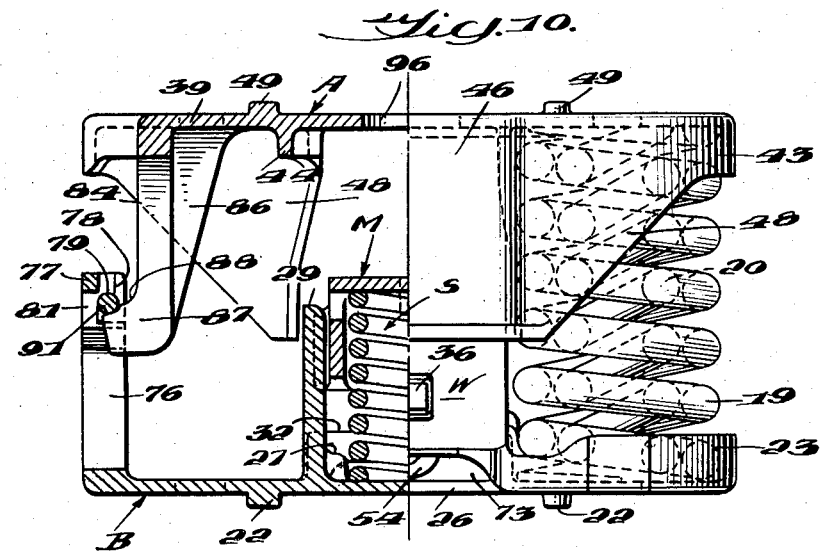
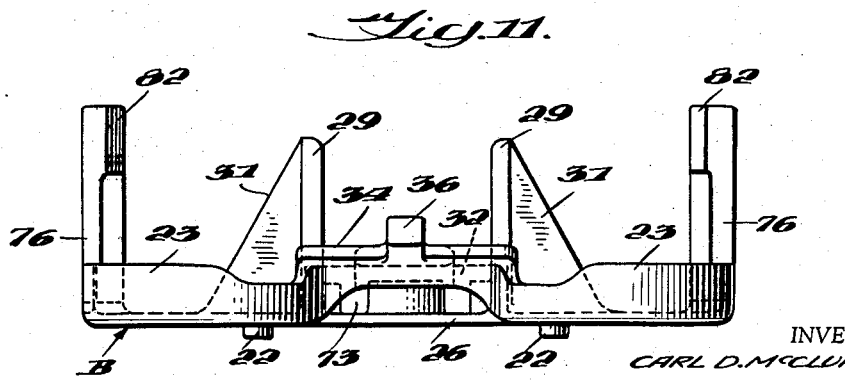
INVENTOR
CARL D. McCLURG,
BY
ATTORNEY July 21, 1959  C. D. McCLURG  2,895,727
COMBINED SPRING GROUP AND FRICTION DAMPER
Filed May 17, 1954  3 Sheets-Sheet 3
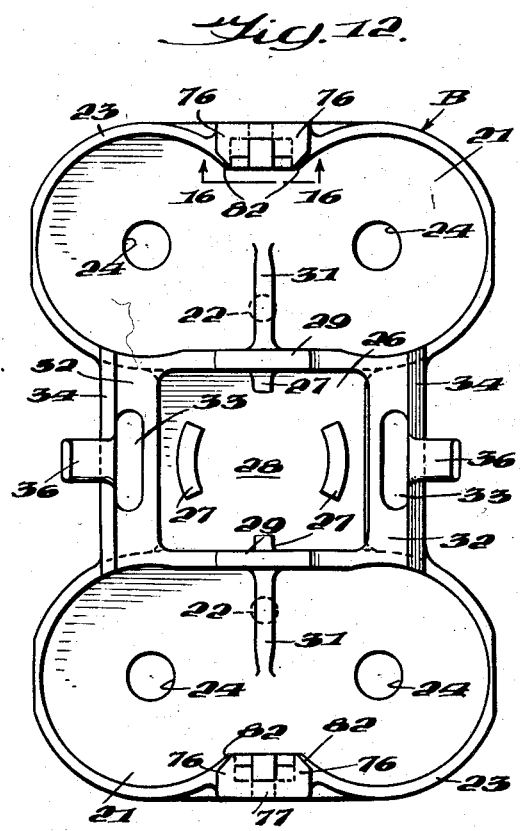
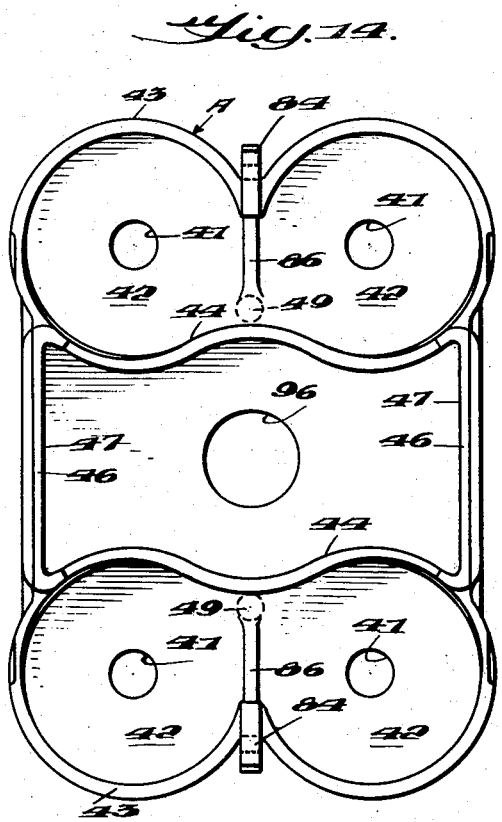
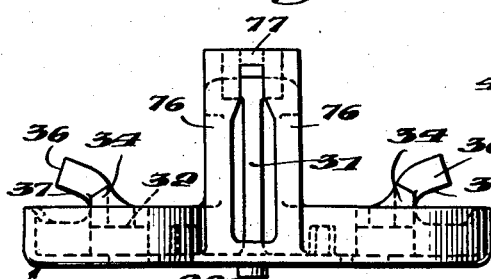
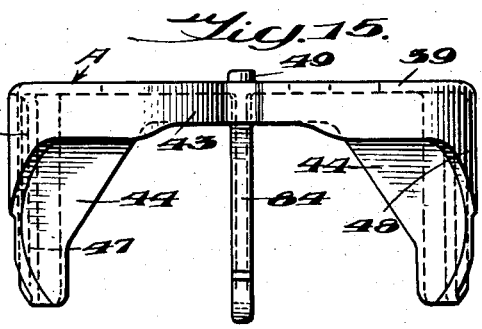
INVENTOR
CARL D. McCLURG,
BY
ATTORNEY

United States Patent Office 2,895,727
Patented July 21, 1959

---

2,895,727

COMBINED SPRING GROUP AND FRICTION DAMPER

Carl D. McClurg, Columbus, Ohio, assignor to The Buckeye Steel Castings Company, Columbus, Ohio Application May 17, 1954, Serial No. 430,193

22 Claims. (Cl. 267—9)

This invention relates to a unit comprising a group of springs for supporting the bolster of a railway car truck and a snubbing mechanism of the friction type to damp recoil of the springs.

An object of the invention is to provide a combined spring group and damping unit wherein the friction snubbing mechanism is actuated by a bridge member acting under the influence of a spring which serves to urge the bridge member to a position maintaining other elements of the mechanism in friction relationship with other parts of the device and to provide a packaged unit which may be readily assembled and maintained in the assembled relationship prior to mounting on a railway car truck.

A further object of the invention is to provide a packaged spring group and damping mechanism so constructed that the interengaging frictional surfaces are of a large area without increasing the overall dimensions of the unit and to provide a device wherein elements of the device may be reversed when the active frictional faces thereof are worn without replacing parts of the device.

A still further object of the invention is to provide novel means for holding the parts of the packaged unit in assembled relation so that the combined spring group and damping mechanism may be shipped and installed in car trucks with the retaining means so constructed that the parts are readily freed for normal operation.

Other objects and features of the invention will be more apparent to those skilled in the art as the present disclosure proceeds and upon consideration of the following detailed description and the accompanying drawings wherein an exemplary embodiment of the invention is disclosed.

In the drawings:

Fig. 1 is a top plan view of a spring group and damping mechanism embodying the invention with the right hand portion representing a sectional view taken on the line 1—1 of Fig. 2.

Fig. 2 is a sectional view taken on the line 2—2 of Fig. 1 with the load supporting springs removed.

Fig. 3 is a plan view of a bridge member for the damping mechanism.

Fig. 4 is a side elevational view of the bridge member.

Fig. 5 is an end view.

Fig. 6 is an end elevational view of one of the wedges.

Fig. 7 is a side elevational view thereof.

Fig. 8 is a plan view of the wedge taken from the base end thereof.

Fig. 9 is a side elevation of the top member.

Fig. 10 in the right portion is a side elevational view of the spring group and damping mechanism while the left portion is a sectional view taken on the line 10—10 of Fig. 1 with load springs at one corner omitted.

Fig. 11 is a side elevation of the bottom member.

Fig. 12 is a plan view of the bottom member.

Fig. 13 is an end elevational view of the bottom member.

Fig. 14 is a plan view of the top member when it is in an inverted position.

Fig. 15 is an end elevational view of the top member.

Fig. 16 is a fragmentary perspective of an upper portion of the post structure taken generally in the direction of the arrows 16 in Fig. 12.

Fig. 17 is a fragmentary side elevation of the post structure and the locking lug showing the position of the pin immediately prior to the latched position.

A damping mechanism and load supporting springs of the package unit type exhibiting the invention includes a top member A and a bottom member B with load supporting springs interposed between these two members. At least one coil spring 19 is arranged in each corner of the device as shown in Fig. 1 and a further coil 20 may be positioned within certain or all of the helical springs 19 as the load capacity of the device varies and as required for supporting the bolster of a railway car truck. The unit further comprises a damping mechanism for snubbing recoil actions of the load supporting springs and the snubbing elements include two wedges W which are mounted in relatively fixed positions in an intermediate portion of the assembly and between the load supporting springs. The wedges W are moved into frictional engagement with generally vertical surfaces carried by the top member A by means of a bridge member M and a single actuating spring S. The structural features of these parts and the cooperative relationship thereof will be more clearly understood as the present disclosure proceeds.

The bottom member B is best shown in Figs. 11 to 13 and includes end plate portions 21 having flat undersurfaces for engaging the spring seat of a railway car truck or a spring plank. These plate portions carry depending lugs 22 adapted to enter spaced holes in the spring seat of a side frame or similarly spaced openings in the spring plank. A flange structure 23 of arcuate formation extends upwardly from the plate portion 21. These flange structures reinforce the bottom member and assist in retaining the lower ends of the load supporting springs in proper positions engaging the top faces of the plate portions 21. The bottom member is provided with a plurality of openings 24 (Fig. 12) in approximate coaxial alignment with the open axes of the load supporting springs through which water, cinders or the like may escape.

The plate-like portions 21 of the bottom member B which provides spring seats and pockets for the lower ends of the load supporting springs are joined by an intermediate plate portion 26 of less width than the end extremities of the bottom member. The intermediate plate 26 joins the plate portions 21 and may be integral therewith. The upper surface of the plate 26 is flat and carries a plurality of upstanding arcuate lugs 27. A spring seat 28 is provided by the upper face of the plate 26 between the lugs 27. The lugs 27 embrace peripheral portions of the spring S and maintain it in a relatively fixed position on the bottom member. An upstanding arm 29 is provided at each end of the intermediate plate 26 which extends above the flange structure as shown in Fig. 11. These are for the purpose of guiding the bridge member as hereinafter described and the arms 29 are reinforced by means of gusset webs 31 which join outer faces of the arms 29 and the plate portions 21 of the bottom member.

The bottom member B is provided with a shelf 32 at each side thereof which is positioned above the plane of the intermediate plate 26. The shelves 32 extend throughout the length of the intermediate plate 26 and join the flange structures 23. An elongated opening 33 is provided in each shelf as best shown in Fig. 12. An upwardly and outwardly extending rib 34 is provided along the outer edge of each shelf 32 which projects above the plane of the shelf 32. A lug 36 integral with each rib 34 extends upwardly and outwardly therefrom. Each lug 36 is of a rigid character and provided with a straight undersurface 37. The lugs 36 are for the purpose of retaining the wedges in relatively fixed positions and the function thereof will be more clearly understood as the disclosure proceeds.

The top member A includes a plate 39 having areas 42 for engaging upper ends of the load supporting springs 19 and the coils 20 when they are used. The top member is generally of rectangular shape and the plate 39 is provided with holes 41 approximately in the centers of the spring engaging areas 42. A flange structure 43 of arcuate formation depends from the perimeter of the spring engaging portions 42 which serves to reinforce the top member and to embrace upper ends of the load supporting springs. Inner flange structures 44 assist in maintaining the load supporting springs in position and serve to reinforce the top member in the vicinity of the damping mechanism. The intermediate portion of the top member includes two depending walls 46 which have substantially vertical inner surfaces 47. The flange structure 43 extends downwardly in the areas indicated at 48 to reinforce the depending walls 46. A pair of lugs 49 project upwardly from the plate 39 which are adapted to enter holes in the bolster and prevent lateral movement of the top member relative to the bolster.

The bridge member M forms a part of the damping mechanism and is shown in detail in Figs. 3 to 5. The bridge member has a top central portion 51 which provides a spring seat 52 thereunder for engagement by the upper end of the actuating spring S (Fig. 2). The bridge member includes inclined walls 53 which diverge from each other in proceeding downwardly from opposite ends of the intermediate top portion 51. An ear 54 extends vertically below the lower end of each of the inclined walls 53 and an aperture 56 is provided in each ear 54. The inclined walls 53 are joined by side walls 57 and an elongated slot 58 is formed in each side wall 57 in the vicinity of the spring seat 52 for the purpose of facilitating the cleansing of the casting during manufacture. The inclined walls 53 are of greater width than the intermediate top portion 51 as will be apparent from a consideration of Fig. 3. The dimension between the outer faces of the side walls 57 is such that the bridge member will fit with slight clearance between the arms 29 of the bottom member and the end portions 59 of the inclined walls 53 lie outside the inner faces of the arms 29 to limit the lateral shifting of the bridge member relative to the bottom member. A pair of lugs 61 on the bridge member extends outwardly from the confluence of the top portion 51 and the inclined walls 53.

The damping mechanism includes two wedges W which are of identical construction and the details of one of the wedges are shown in Figs. 6 to 8. A wedge includes two plates 63 and 64 which diverge from each other in proceeding from the apex end 66. The plates 63 and 64 are joined near the base of the wedge by means of two tie bars 67. A notch 68 is provided in the central portion of each plate member 63 and 64 near the base end thereof. These notches are for the purpose of receiving the lugs 61 when the device is assembled. An aperture 69 is provided through the apex portion of the wedge. A convex surface 71 forms the lower boundary of the aperture 69 so as to permit rocking of the wedge relative to the lug 36.

In assembling the combined spring group and damping mechanism the spring S is first placed in position with its lower end engaging the spring seat 28 between the lugs 27. The bridge member M is then placed in position over the spring S so that the upper end thereof engages the spring seat 52. The bridge member is moved downwardly by applying force in any suitable manner to the top portion 51. The ears 54 of the bridge member thus move downwardly in the respective openings 33 until the apertures 56 are below the undersurfaces of the shelves 32. A pin (not shown) is then introduced into each aperture 56 and these pins may be applied through the open areas 73 (Fig. 10). The wedges W are then applied. Each wedge is arranged in position with the lug 36 extending into the aperture 69. A notch 68 of each wedge receives a lug 61 and one plate of each wedge lies along one of the inclined walls 53 of the bridge member M. In this assembled relationship the outer plates of the wedges are disposed in substantially vertical positions.

The load supporting springs are then arranged with their lower ends engaging the plate portions 21 of the bottom member B within the flange structure 23. The top member A is then arranged over the assembly so that the upper ends of the load springs engage the areas 42 defined in the flange structures 43 and 44. The inner faces 47 of the walls 46 then lie along the vertical plates of the wedges W.

The device is provided with a novel arrangement for maintaining the elements in an assembled relationship. It is for this purpose that the bottom member is provided with a post structure at each end which includes two arms 76 (Fig. 13) which may be formed integral with the flange structure 23 of the bottom member and extend upwardly therefrom. The arms 76 are joined at the top by a tie member 77. A recess is provided at the inner side of the post structure adjacent the tie member 77 and the details are shown in Fig. 16. The recess is provided with abutment faces 78 which are spaced inwardly from the inner face of the tie member 77. Below the abutment faces 78 a pair of downward facing shoulders 79 are provided within the recess. Such a post structure is provided at each end of the bottom member B and the inner corners of the upstanding arms 76 are bevelled at 82 to provide clearance for the load supporting springs.

The top member is provided with a pair of depending arms 84 which may be formed integral with the top plate 39. The arms 84 may be reinforced by webs 86. The lower end of each arm 84 has an outwardly extending lug 87 which is adapted to be disposed between the arms 76 of the post structure carried by the bottom member. Two concave surfaces 88 and 89 (Fig. 9) are provided on the upper edge of the lugs 87. The outer ends of the lugs 87 clear the inner faces of the tie member 77 as the top member A moves downwardly relative to the bottom member B.

A final stage in assembling the device involves the positioning of the pins 91 (Fig. 17) on the concave surface 88 of the lugs 87 and these pins in the uncompressed state of the load supporting springs are so located that the ends of the pins engage the abutment surfaces 78 as shown in Fig. 17. When force is applied to compress the load supporting springs the pins 91 move downwardly into the recesses and are then in position over the concave surfaces 89. The pins 91 are of such length as to move within the respective recesses. Thus when the force compressing the load spring is relieved upward movement of the top member A is prevented by the pins 91 engaging the shoulders 79 and this position of the parts is shown in Fig. 10.

The top member is provided with a relatively large central opening 96. A block or similar means may be inserted through the opening 96 so that it will engage the top 51 of the bridge member M. Force may be applied to the block (not shown) so as to move the bridge member downwardly against the action of the spring S. The pins previously inserted through the aperatures 56 may then be withdrawn. The actuating spring S is then free to expand and force the bridge member M upwardly. The wedges W are retained against upward movement by means of the lugs 36 but the wedges are urged outwardly so that the vertically disposed plates are urged into frictional engagement with the wall surfaces 47.

The device is maintained in the assembled condition by means of the pins 91. The unit may then be inserted in a railway car truck and when weight imposed on the bolster of the car is applied to the top members of the package units the load springs are compressed to free the retaining pins 91. These pins may then be readily removed from the unit and the combined spring group and damping mechanism is then in condition for operation.

While the invention has been described with reference to a particular structural arrangement and with regard to details of the parts it will be appreciated that changes may be made in the shape and type of the elements as well as the overall organization. Such modifications and others may be made without departing from the spirit and scope of the invention as set forth in the appended claims.

What I claim and desire to secure by Letters Patent is:

1. In a combined spring group and damping mechanism, a first member, a second member, vertically disposed load supporting springs between the first and second members, walls on an intermediate portion of the first member having generally vertical inner faces, a spring seat on an intermediate portion of the second member, a bridge member having inclined surfaces at the ends thereof facing said vertical surfaces, an actuating spring engaging said spring seat and said bridge member, a wedge disposed between each inclined surface of the bridge member and a vertical face on the first member, and lugs carried by the second member each engaging an apex portion of the associated wedge whereby said actuating spring and the bridge member urge outer faces of the wedges into engagement with said vertical faces.

2. In a combined spring group and damping mechanism, a top member, a bottom member, vertically disposed load supporting springs between the top and bottom members, means depending from an intermediate portion of the top member having generally vertical inner surfaces thereon, a centrally positioned spring seat on the bottom member, a spring engaging said spring seat at its lower end, a bridge member urged upwardly by said spring, downwardly and outwardly sloping faces at ends of said bridge member facing said vertical surfaces, a pair of wedges each having a face engaging a sloping face on the bridge member and another face engaging one of said vertical surfaces, and two elements carried by the bottom member each extending into and engaging an interior apex portion of one wedge restraining said wedges from movement away from the bottom member in response to action of said spring and said bridge member.

3. In a combined spring group and damping mechanism, a top member, a bottom member, vertically disposed load supporting springs between the top and bottom members, means depending from an intermediate portion of the top member having generally vertical inwardly facing surfaces thereon, a spring seat on the bottom member, an actuating spring engaging said spring seat at its lower end, a bridge member urged upwardly by said spring, downwardly and outwardly sloping faces at ends of said bridge member respectively facing said vertical surfaces, a pair of wedges each having a face engaging a sloping face of the bridge member and another face engaging one of the vertical surfaces, means restraining said wedges from upward movement, an ear at each end of said bridge member, a shelf carried by the bottom member adjacent each ear and each shelf having a slot therein for receiving one of said ears, and each ear having an aperture therethrough for receiving a pin below the associated shelf when the actuating spring is compressed.

4. In a combined spring group and damping mechanism, a top member, a bottom member, vertically disposed load supporting springs between the top and bottom members, means depending from an intermediate portion of the top member having generally vertical inner wall surfaces thereon, a spring seat on the bottom member, a spring engaging said spring seat at its lower end, a bridge member urged upwardly by said spring, a downwardly and outwardly sloping face at each end of said bridge member facing one of said vertical surfaces, a pair of wedges each having a face engaging one face of said bridge member and another face engaging one of the vertical surfaces, means restraining said wedges from upward movement, post structures extending upwardly from the bottom member, arms depending from the top member each terminating adjacent one of said post structures, each of said post structures having a recess therein facing the associated arm, downwardly facing shoulders within each recess, and a removable pin extending transversely over each arm within the associated recess under the shoulders thereof restraining relative movements of the members from each other.

5. A bottom member for a combined damping mechanism and spring group comprising, plate portions and an intermediate portion joining said plate portions, arcuate flange structures along the perimeter of the plate portions and extending upwardly therefrom, a spring seat on said intermediate portion, a pair of shelves on said intermediate portion positioned above the plane of said spring seat and joining said flange structures, each shelf having an elongated opening therein, a lug carried by and extending upwardly and outwardly from each shelf, and each lug having a substantially straight undersurface thereon.

6. A bottom member for a combined damping mechanism and spring group comprising, plate portions and an intermediate portion joining said plate portions, arcuate flange structures along the perimeter of the plate portions and extending upwardly therefrom, a spring seat on said intermediate portion, a pair of shelves positioned above the plane of said intermediate portion, a lug extending upwardly and outwardly from each shelf, a post structure including a pair of arms extending upwardly from each end of the plate portions, a tie member connecting upper ends of each pair of arms, each post structure having a recess therein adjacent the respective tie member open at an inner side of the post structure, and downwardly facing shoulders on the post structure within each recess.

7. A combined spring group and damping mechanism comprising, a first member, a second member, load supporting springs between said members, means extending from an intermediate portion of the first member having generally vertical inner surfaces thereon, a bridge member having inclined surfaces at the ends thereof facing said vertical surfaces, a spring engaging the second member and the bridge member urging it towards the first member, a pair of wedges each having a face engaging one inclined surface on the bridge member and another face engaging one of said vertical surfaces, each of said wedges having an aperture in the apex portion thereof, a lug carried by the second member extending into the aperture of one wedge and engaging it therein, and a lug carried by the second member extending into the aperture of the other wedge and engaging it therein.

8. In a combined spring group and damping mechanism, a first member, a second member, load supporting springs between said members, means extending from an intermediate portion of the first member having generally vertical inner surfaces thereon, a bridge member having inclined surfaces at the ends thereof facing said vertical surfaces, resilient means engaging the bridge member and the second member urging the bridge member towards the first member, two wedges each having a face engaging an inclined surface of the bridge member and another face engaging a vertical surface on the first member, each of said wedges having an aperture in the apex portion thereof, a lug carried by the second member extending into the aperture of one wedge, a lug carried by the second member extending into the aperture of the other wedge, and a convex surface on each wedge within the aperture engaging the associated lug.

9. In a combined spring group and damping mechanism, a first member, a second member, load supporting springs between said members, means extending from the first member having generally vertical inner surfaces thereon, a bridge member having inclined surfaces at the ends thereof facing said vertical surfaces, resilient means reacting against the second member and the bridge member urging it towards the first member, two wedges each having a face engaging an inclined surface on the bridge member and a face engaging one of said vertical surfaces, each wedge having an aperture in the apex portion thereof, a lug carried by said second member extending into the aperture of one wedge restraining it from movement towards the first member, and a lug carried by said second member extending into the aperture of the other wedge restraining it from movement towards the first member.

10. A combined spring group and damping mechanism comprising, a first member, a second member, load supporting springs between said members, means extending from an intermediate portion of the first member having generally vertical inner surfaces thereon, a bridge member having inclined surfaces at the ends thereof facing said vertical surfaces, resilient means reacting against said second member urging the bridge member towards the first member, two wedges each having a face engaging one inclined surface on the bridge member and a face engaging one of said vertical surfaces, each wedge having an aperture in the apex portion thereof, detent means carried by the second member extending into and engaging each wedge restraining said wedges from movement towards the first member, each wedge having a notch therein, a lug on the bridge member extending into the notch of one wedge, and another lug on the bridge member extending into the notch of the other wedge.

11. In a combined spring group and damping mechanism, a first member, a second member, load supporting springs between said members, a friction damping mechanism disposed between the load supporting springs snubbing movements of the members towards and away from each other, a post structure extending from the second member including a pair of arms, a horizontally disposed tie member joining free ends of said arms, said post structure having a recess therein adjacent the tie member, shoulders within said recess facing the second member, an arm extending from the first member, a lug extending laterally from the arm adapted to clear said tie member during movement of the members towards each other, a pin within the recess engaging said shoulders, and a surface on said lug engaging said pin to restrain movements of the members from each other.

12. In a combined spring group and damping mechanism, a top member, a bottom member, load supporting springs between the top and bottom members, a friction damping mechanism disposed between the top and bottom members for snubbing relative movements of said members towards and from each other, a post structure extending upwardly from the bottom member including a pair of arms, a horizontally disposed tie member joining upper ends of said arms, said post structure having a recess therein adjacent the tie member, horizontally aligned abutment faces on said post structure adjacent said recess, downwardly facing shoulders at lower ends of said abutment faces within the recess, an arm depending from the top member, a lug extending laterally from the arm adapted to clear said tie member during movement of the top member towards the bottom member, a surface on said lug for receiving a transversely disposed pin and holding it against said abutment faces when the load supporting springs are in an uncompressed condition, and another surface on said lug for engaging said pin when it is in the recess and engages said downwardly facing shoulders.

13. A top member for a spring group and damping mechanism comprising, a generally rectangular shaped plate, a flange structure of arcuate formation depending from end portions of the plate, means depending from the intermediate portion of the plate having vertical faces thereon, an arm depending from each end of the plate, an outwardly disposed lug at the lower end of each arm, a transversely extending upwardly facing concave surface on each lug, and a second transversely extending upwardly facing concave surface on each lug positioned below the first concave surface.

14. In a combined spring group and damping mechanism, a first member, a second member, load supporting springs between said members, means carried by the first member having generally vertically inner surfaces thereon, a bridge member having inclined surfaces at the ends thereof facing said vertical surfaces, resilient means reacting against the second member and the bridge member urging it towards the first member, two wedges each having faces which diverge from each other at an acute included angle, one face of each wedge engaging an inclined surface on the bridge member and the other face of the wedge engaging one of said vertical surfaces, restraining means carried by the second member engaging each wedge near the apex thereof preventing movement of the wedges away from the second member, and each restraining means engaging the associated wedge in a plane between the angular disposed faces of the wedge.

15. A bottom member for a combined damping mechanism and spring group comprising, plate portions and an intermediate portion joining said plate portions, arcuate flange structures along the perimeter of the plate portions and extending upwardly therefrom, a spring seat on said intermediate portion, a shelf extending along one side of said intermediate portion joining said flange structures and positioned above the plane of said spring seat, another shelf extending along the other side of said intermediate portion joining said flange structures and positioned above the plane of said spring seat, each shelf having an elongated opening extending lengthwise thereof, a rib projecting above each shelf and extending along an outer edge thereof, and a lug integral with a mid-portion of each rib extending upwardly and outwardly therefrom.

16. A top member for a spring group and damping mechanism comprising, a generally rectangular shaped plate, flange structures of arcuate formation depending from ends of the plate defining outer perimeters of spring seats on an undersurface of the plate, wall members depending from an intermediate portion of the plate having substantially vertical inner faces, extensions on said flange structures depending therebelow and merging with lower edges of said walls, an arm depending from each end of the plate, an outwardly disposed lug at a lower end of each arm, and two adjoining upwardly facing transversely extending concave surfaces on each lug with one concave surface positioned above the other.

17. A bridge member for a combined damping mechanism and spring group comprising, a plate-like intermediate portion, inclined walls extending downwardly from ends of said intermediate portion and diverging from each other, said inclined walls having a greater width than said intermediate portion, an ear carried by a central lower edge of each inclined wall, each of said ears having an aperture extending transversely therethrough, and a lug extending outwardly from the mid-portion of each inclined wall at the confluence thereof with the intermediate portion.

18. A bridge member for a combined damping mechanism and spring group comprising, a plate-like intermediate portion, inclined walls extending downwardly from ends of said intermediate portion and diverging from each other, said inclined walls having a greater width than said intermediate portion, an ear carried by a central lower edge of each inclined wall, each of said ears having an aperture extending transversely therethrough, a lug extending outwardly from each inclined wall at the confluence thereof with said intermediate portion, side walls on said bridge member having outer surfaces flush with edges of said intermediate portion, and said side walls joining said inclined walls inwardly of the side edges thereof.

19. In a combined spring group and damping mechanism, a first member, a second member, load supporting springs between said members, means extending from the first member having generally vertically inner surfaces thereon, a bridge member having inclined surfaces at ends thereof facing said vertical surfaces, resilient means reacting against the second member and the bridge member urging it towards the first member, two wedges each having a face engaging an inclined surface on the bridge member and a face engaging one of said vertical surfaces, rigid elements carried by the second member with one engaging one of said wedges adjacent the apex thereof and within the planes defined by the faces of the wedge restraining the wedges from movement away from the second member, shelves on the second member each having a slot therein, and an ear carried by each end of the bridge member extending into one of said slots.

20. A wedge for a combined spring group and damping mechanism comprising, two plates converging towards each other and joined at adjacent ends thereof to form an apex of the wedge, a planar surface forming the entire outer face of each of said plates, spaced tie bars connecting base portions of said plates, said apex end having an aperture therethrough, a convex bearing surface facing the base portion of the wedge and defining a continuous wall of said aperture adjacent the apex end of the wedge, and said convex surface being of arcuate formation from the outer plane surface of one plate to the outer plane surface of the other plate.

21. A wedge for a combined spring group and damping mechanism comprising, two plates converging towards each other and joined at adjacent ends and forming an apex portion of the wedge, a planar surface forming the entire outer face of each of said plates, spaced tie bars connecting base portions of said plates, each plate having a notch in the mid-part of the base portion which extends through the plate and is open at the base end of each plate, said apex portion of the wedge having an aperture therethrough, a convex bearing surface facing the base portion of the wedge defining a wall of said aperture adjacent the apex end of the wedge, and said convex surface arching from the outer plane face of one plate to the outer plane face of the other plate.

22. A bottom member for a combined damping mechanism and spring group comprising, plate portions and an intermediate portion joining said plate portions, arcuate flange structures along the perimeter of the plate portions and extending upwardly therefrom, a post structure extending upwardly from each flange structure at outer ends of the plate portions, each post structure including a pair of parallel arms, a horizontal tie member joining upper ends of said arms, an inwardly facing vertical abutment surface on each arm positioned inwardly of said tie member, a downwardly facing shoulder on each arm below the associated abutment surface with said downward facing shoulders positioned outwardly of the respective abutment surfaces, and each arm having an inwardly facing recess therein below said shoulder.

References Cited in the file of this patent

UNITED STATES PATENTS

| | | |
|---|---|---|
| 1,884,594 | Davis | Oct. 25, 1932 |
| 1,988,427 | Barrows | Jan. 15, 1935 |
| 2,065,992 | Barrett | Dec. 29, 1936 |
| 2,329,338 | Dath | Sept. 14, 1943 |
| 2,390,110 | Light | Dec. 4, 1945 |
| 2,569,950 | Quinn | Oct. 2, 1951 |
| 2,613,075 | Barrett | Oct. 7, 1952 |
| 2,627,402 | Smith | Feb. 3, 1953 |
| 2,652,244 | Christenson | Sept. 15, 1953 |
| 2,657,041 | Cottrell | Oct. 27, 1953 |
| 2,682,398 | Pearson | June 29, 1954 |
| 2,687,295 | Tucker | Aug. 24, 1954 |
| 2,687,296 | Tucker | Aug. 24, 1954 |
| 2,695,167 | Ramos et al. | Nov. 23, 1954 |
| 2,747,861 | Cottrell | May 29, 1956 |